United States Patent
Kitabayashi et al.

(10) Patent No.: US 6,320,709 B1
(45) Date of Patent: Nov. 20, 2001

(54) METHOD FOR INSTALLING ELECTRO-OPTICAL DEVICE TO PRISM AND MANUFACTURING METHOD FOR A PROJECTOR

(75) Inventors: Masashi Kitabayashi, Nagano-ken; Motoyuki Fujimori, Suwa; Kazuyuki Iinuma, Nagano-ken, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/438,534

(22) Filed: Nov. 12, 1999

(30) Foreign Application Priority Data

Nov. 18, 1998 (JP) .................................................. 10-328108

(51) Int. Cl.⁷ ........................................................ G02B 5/04
(52) U.S. Cl. ......................... 359/831; 359/254; 359/833; 359/900; 349/58; 353/81
(58) Field of Search .................................... 359/245, 254, 359/634, 831, 833, 834, 900; 349/58, 59, 113, 114; 353/31, 33, 34, 81

(56) References Cited

U.S. PATENT DOCUMENTS 5,749,641 * 5/1998 Brice et al. ............................ 353/81
5,868,485 * 2/1999 Fujimori et al. ..................... 353/119

FOREIGN PATENT DOCUMENTS

A-4-118368   4/1992 (JP) .
A-10-10994   1/1998 (JP) .

* cited by examiner

Primary Examiner—Cassandra Spyrou
Assistant Examiner—Euncha Cherry
(74) Attorney, Agent, or Firm—Oliff & Berridge, PLC

(57) ABSTRACT

A method for installing an electro-optical device to a prism and a manufacturing method for a projector that permit improved positional accuracy, improved fixing operation efficiency, and a simplified fixing operation process of an electro-optical device are provided. The methods are provided with spacer mounting process steps for mounting a spacer via an adhesive agent between a panel frame assembly, which holds an electro-optical device, and a prism, position adjusting process steps for adjusting a position where the panel frame assembly is installed to the prism after the spacer mounting process steps, and panel frame assembly fixing process steps for fixing the panel frame assembly by hardening the adhesive agent after the position adjusting process steps.

23 Claims, 14 Drawing Sheets

METHOD FOR INSTALLING ELECTRO-OPTICAL DEVICE TO PRISM AND MANUFACTURING METHOD FOR A PROJECTOR

BACKGROUND OF THE INVENTION

1. Field of Invention

The present invention relates to a method for installing an electro-optical device such as a liquid crystal panel, CCD device, or a panel employing an illuminant, to a prism, such as a dichroic prism or a polarization beam splitter, and a manufacturing method for a projector that employs the foregoing method.

2. Description of Related Art

As a conventional method for installing an electro-optical device, such as a liquid crystal panel to a prism, there are methods whereby an electro-optical device is directly attached to a prism, or a method such as that disclosed in Japanese Unexamined Patent Publication No. 10-10994.

The technology disclosed in Japanese Unexamined Patent Publication No. 10-10994 will be briefly explained in conjunction with FIG. 13 and FIG. 14.

First, a liquid crystal panel unit 70R is installed to a light incident surface 72R of a prism composite 72 of a projector. The panel unit 70R is formed of a fixing frame member 76 on an innermost side that is adhesively fixed to the light incident surface 72R of the prism composite 72, a panel frame assembly 73 on an outermost side that holds and retains a liquid crystal panel 80R, and an intermediate frame member 77 disposed between the fixing frame member 76 and the panel frame assembly 73. The panel frame assembly 73 has a first frame member 74 and a second frame member 75, the liquid crystal panel 80R being sandwiched between these frame members 74 and 75.

Engaging lugs 77b protuberantly provided outward at the four corners of the intermediate frame member 77 are adhesively fit in engaging holes 74b formed at the four corners (of the first frame member 74) of the panel frame assembly 73, and the intermediate frame member 77 and the panel frame assembly 73 are adhesively fixed with a spacer 78 which is shaped in a substantially triangular prism and installed between the intermediate frame member 77 and the panel frame assembly 73.

The configuration is accomplished by an installing method illustrated by a simplified flowchart in FIG. 14.

First, the fixing frame member 76 is positioned and adhesively fixed to the light incident surface 72R of the prism composite 72 (step S1 of FIG. 14). Then, the intermediate frame member 77 is positioned on the outer side of the fixing frame member 76, which has been adhesively fixed, and secured with four screws 79 by inserting them in tapped holes 77a and 76a (step S2 of FIG. 14).

After that, engaging holes 74b provided in the first frame member 74 of the panel frame assembly 73 holding and retaining the liquid crystal panel 80R are filled with an adhesive agent, then the engaging lugs 77b of the intermediate frame member 77 are fit in the engaging holes 74b thereby to mount the panel frame assembly 73 on the intermediate frame member 77 (step S3 of FIG. 14). The foregoing steps S1 through S3 constitute a panel mounting process.

Next, the liquid crystal panel 80R is lit under this condition (step S4 of FIG. 14) to perform focus adjustment and alignment adjustment of the liquid crystal panel 80R (steps S5 and S6 of FIG. 14). Steps S4 through S6 are carried out mainly to adjust the position or tilt of the liquid crystal panel 80R on or with respect to an optical axis. The foregoing steps S4 through S6 constitute a position adjustment process.

Then, the adhesive agent charged in the engaging holes 74b is hardened to temporarily fix the intermediate frame member 77 and the panel frame assembly 73 (step S7 of FIG. 14). After that, a displacement amount of the position of a pixel of the liquid crystal panel 80R is checked (step S8 of FIG. 14). As a result, if the displacement amount exceeds a permissible range (if the displacement is unacceptable), then the panel frame assembly 73 is detached (step S12 of FIG. 14) and returned to step S3 mentioned above. These steps S7 and S8 constitute a temporary fixing process.

If the displacement amount is within the permissible range (if the displacement amount is acceptable), then an adhesive agent is applied to the spacer 78 (step S9 of FIG. 14), and the spacer 78 is installed to a predetermined guiding portion formed between the preliminarily fixed intermediate frame member 77 and the panel frame assembly 73 (step S10 of FIG. 14).

Then, the adhesive agent between the spacer 78, the panel frame assembly 73, and the intermediate frame member 77 is hardened to firmly fix the panel frame assembly 73 to the prism composite 72 step S11 of FIG. 14). Steps S9 through S11 constitute a final fixing process.

According to the conventional method set forth above, however, there is a danger in that the liquid crystal panel is displaced in the final fixing process since the panel frame assembly is temporarily fixed after adjusting the position of the liquid crystal panel in relation to the prism, then the final fixing is performed at a different position from the position of the temporary fixing.

Furthermore, the temporary fixing process and the final fixing process respectively require time for hardening the adhesive agent, presenting poor operation efficiency and a complicated operation process because of different hardening positions.

In addition, the provision of the temporarily fixed portions results in many bonded locations which are susceptible to contraction that takes place when the adhesive agent hardens, frequently causing an error in the position of the liquid crystal panel.

Furthermore, since the temporary fixing and the final fixing are performed at different positions, it is very likely that the heat generated by a projector in operation causes the liquid crystal panel to be displaced. For this reason, there has been room for improvement in achieving a projector that remains free from displacement of a liquid crystal panel over an extended time of use.

SUMMARY OF THE INVENTION

Accordingly, one aspect of the present invention to provide a method for installing an electro-optical device to a prism and a manufacturing method for a projector, wherein a temporary fixing step is excluded from the process for fixing an electro-optical device, such as a liquid crystal panel to a prism so as to complete an adhesive agent hardening operation in a single step. Thus, only a spacer is used for adhesively fixing a panel frame assembly for holding an electro-optical device, such as a liquid crystal panel to a prism so as to permit improved positional accuracy of the electro-optical device, improved efficiency of the fixing operation, and a simpler fixing operation process.

To fulfill the object mentioned above, the present invention employs the following:

First, the process may include the following steps (1) through (3).

(1) A spacer mounting step for mounting a spacer via an adhesive agent between an electro-optical device frame assembly, which holds an electro-optical device, and a prism. (2) A position adjusting step for adjusting a position where the electro-optical device frame assembly is installed to the prism after the spacer mounting step. (3) An electro-optical device frame assembly fixing step for fixing the electro-optical device frame assembly by hardening the adhesive agent after the position adjusting step.

After the spacer mounting step of (1), an electro-optical device frame assembly with the spacer attached thereto is formed, then the spacer is attached to the prism thereby to secure the electro-optical device frame assembly to the prism.

More specifically, in the foregoing process, the electro-optical device frame assembly retaining the electro-optical device is supported and secured to a prism only by the spacer via an adhesive agent. In other words, the process of fixing the electro-optical device frame assembly to the prism, i.e. the process of hardening the adhesive agent, can be completed in one step which involves only the spacer. This makes it possible to reduce the positional displacement of the electro-optical device caused by carrying out temporary fixing and final fixing at different positions in the conventional technique, and also to achieve higher efficiency of the fixing operation and a simpler fixing operation process.

Providing the electro-optical device frame assembly fixing process with a plurality of fixing steps for applying the adhesive agent multiple times to gradually harden the adhesive agent enables higher throughput and also higher reliability because a step can be added for judging a hardened condition or other conditions so as to check for defectives during the hardening process.

Moreover, in the spacer mounting process according to the present invention, employing a method for mounting a spacer via an adhesive agent between the electro-optical device frame assembly and an interposed frame assembly which has been fixed to a surface of a prism beforehand facilitates replacement of a liquid crystal panel if the liquid crystal panel incurs a defect due to secular changes or the like.

In other words, if the electro-optical device frame assembly holding a liquid crystal panel is directly fixed to a prism, then the electro-optical device frame assembly must be peeled off from the prism to replace a defective liquid crystal panel, making the operation more difficult. Hence, the prism may be replaced together with the electro-optical device frame assembly in some cases, which is uneconomical.

To overcome the problem mentioned above, an interposed frame assembly may be provided between the prism and the electro-optical device frame assembly that holds the liquid crystal panel. This allows the liquid crystal panel to be replaced by removing only the electro-optical device frame assembly from the prism, with the interposed frame assembly remaining fixed to the prism for convenience and economy.

In order to further enhance the advantage set forth above, a method may be employed wherein the interposed frame assembly used in the present invention is composed of a fixing frame member bonded to a prism and an intermediate frame member detachably secured to the fixing frame member, and a spacer is installed via an adhesive agent between the intermediate frame member and the electro-optical device frame assembly.

More specifically, the method mentioned above allows the intermediate frame member to be easily removed from the fixing frame member directly attached to the prism, so that the electro-optical device frame assembly can be removed together with the intermediate frame member. This feature is convenient since a liquid crystal panel can be easily replaced. In addition, since the liquid crystal panel is not directly fixed adhesively to a prism composite, the prism composite will not be scratched at the time of replacement mentioned above, and costly components can be used without waste.

Furthermore, by implementing the fixed condition checking step for checking for a positional displacement or adhesive condition of an installed electro-optical device frame assembly in the electro-optical device frame assembly fixing process in accordance with the present invention, a defective spacer can be removed before the electro-optical device frame assembly is completely secured to a prism, thus permitting improved quality.

In the fixed condition checking step, a method can be employed in which, if a fixed condition of the electro-optical device frame assembly is found defective, then the spacer serving as a position fixing member can be removed from the electro-optical device frame assembly and the electro-optical device frame assembly can be sent back to the spacer mounting process without a spacer.

Using the aforesaid method makes it possible to effectively recycle a member, which has once been determined to be defective, rather than wasting it, thus enabling a higher yield and reduced cost.

As set forth above, when the process for attaching an electro-optical device to a prism by using the method described above is combined with a manufacturing method for a projector equipped with a plurality of electro-optical devices for forming images, a prism for synthesizing respective luminous fluxes modulated by the electro-optical devices, and a projector for projecting light synthesized by the prism, the positional displacement of a liquid crystal panel in relation to the prism caused by a difference in thermal expansion between members can be minimized since the electro-optical device frame assembly holding the liquid crystal panel is supported on the prism only by the spacer. This makes it possible to maintain high quality over an extended period of time.

Furthermore, in the manufacturing method for a projector in accordance with the present invention, it is preferable to provide a fan for cooling an electro-optical device at below or above a prism and to install spacers at the right and left of an electro-optical device frame assembly. According to the manufacturing method for a projector, a cooling air flow from a unit will not be blocked, so that deterioration of the electro-optical device, changes in characteristics, etc., due to heat can be reduced. In addition, since the spacers are mounted and fixed to the right and left of the electro-optical device frame assembly, a first frame member and an intermediate frame member are free to thermally deform vertically with the spacers being in the centers thereof. Hence, the restraining degree of the thermal deformation of these frame members is low, making it possible to avoid such problems as undesirable concentration of stress and peeling off of spacers.

BRIEF DESCRIPTION OF THE DRAWINGS

FIG. 12(A)–FIG. 12(D) shows states of a spacer in steps S11 and S13 in FIG. 10;

DETAILED DESCRIPTION OF PREFERRED EMBODIMENTS

A preferred embodiment of the present invention will now be described with reference to the accompanying drawings.

Figure 1:
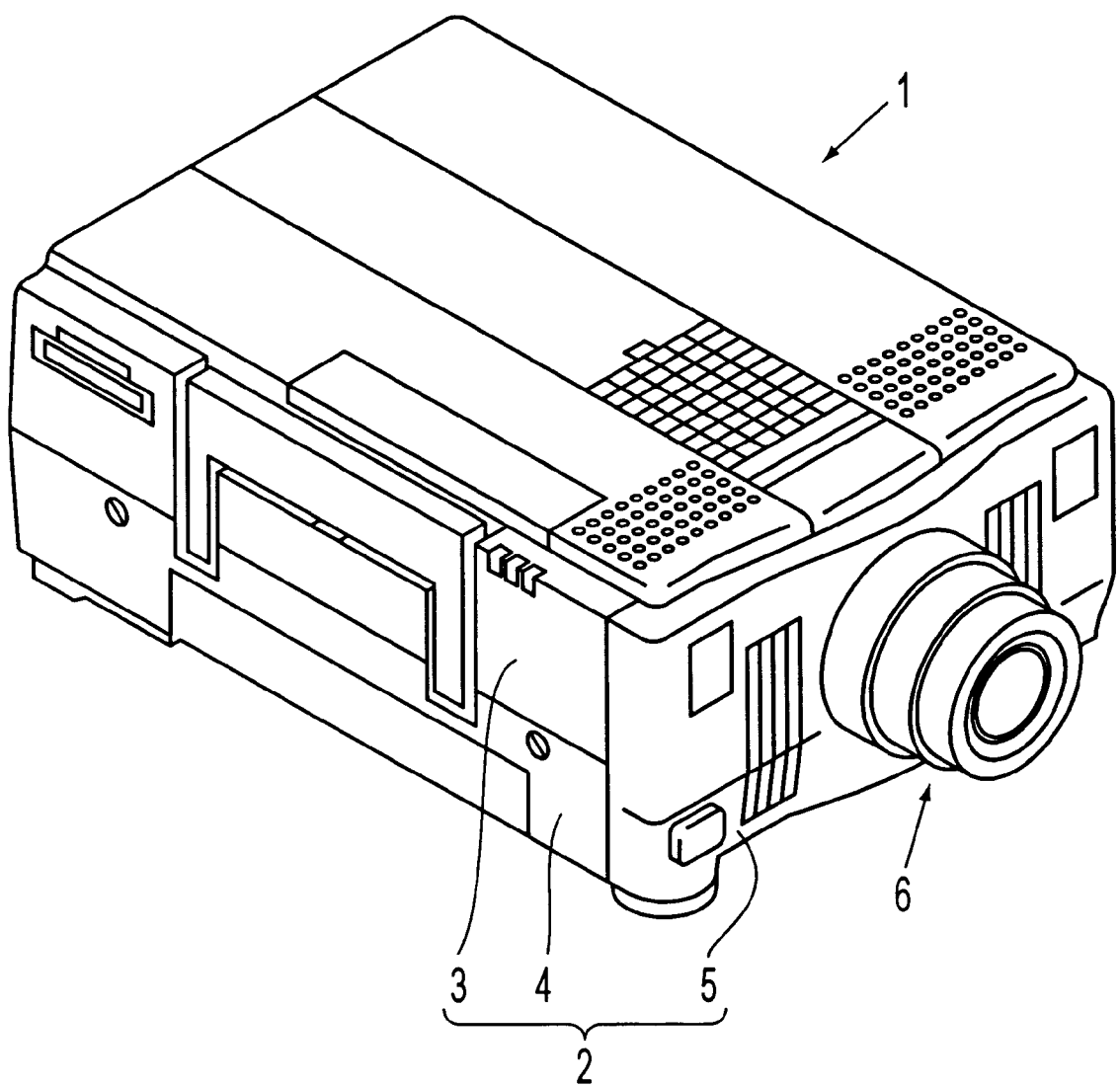
FIG. 1 is a perspective view showing an appearance of a projector to which the present invention has been applied.

FIG. 1 shows an exemplary projector to which the method in accordance with the present invention is applied. An outer case 2 of a projector 1 of this embodiment has a rectangular parallelpiped shape. The outer case 2 is basically formed of an upper case 3, a lower case 4, and a front case 5 that defines a front surface of the device. A distal end portion of a projection lens unit 6 protrudes from the center of the front case 5.

Figure 2A:
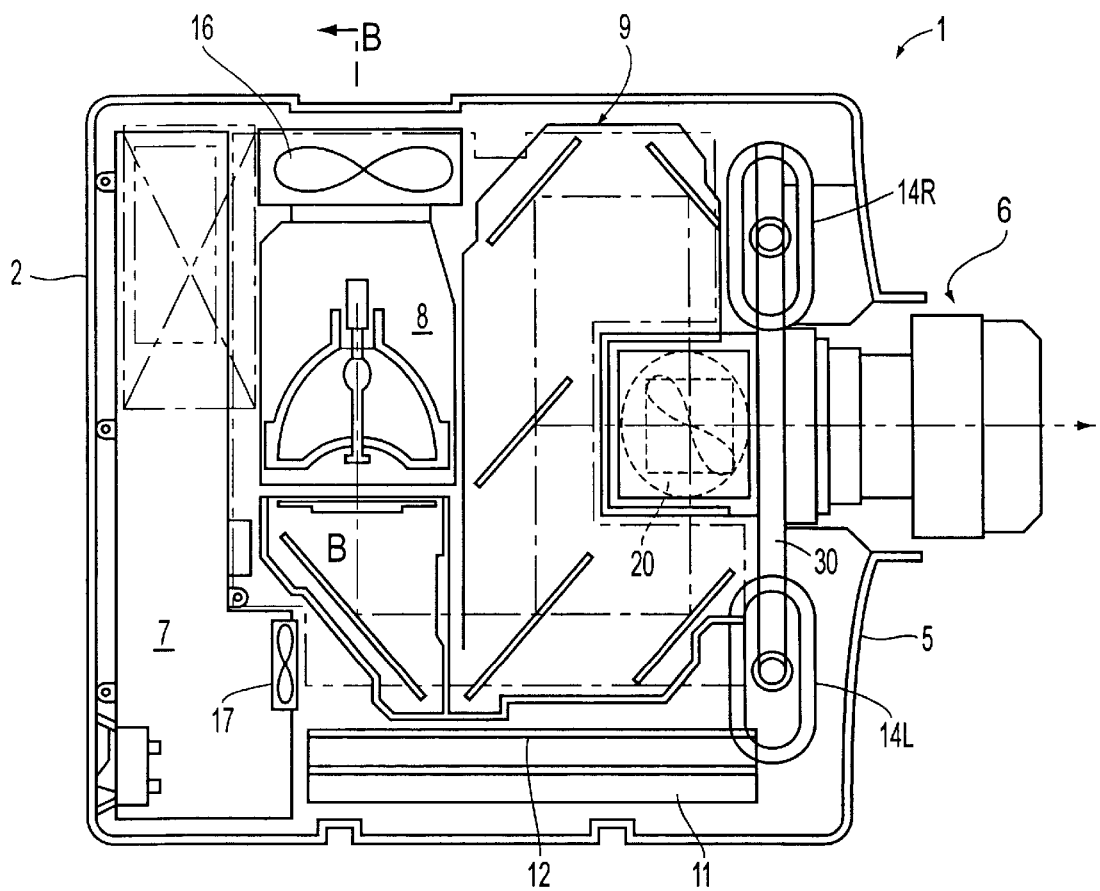
FIG. 2(A) is a diagram showing a two-dimensional layout of components inside the device of FIG. 1.
Figure 2B:
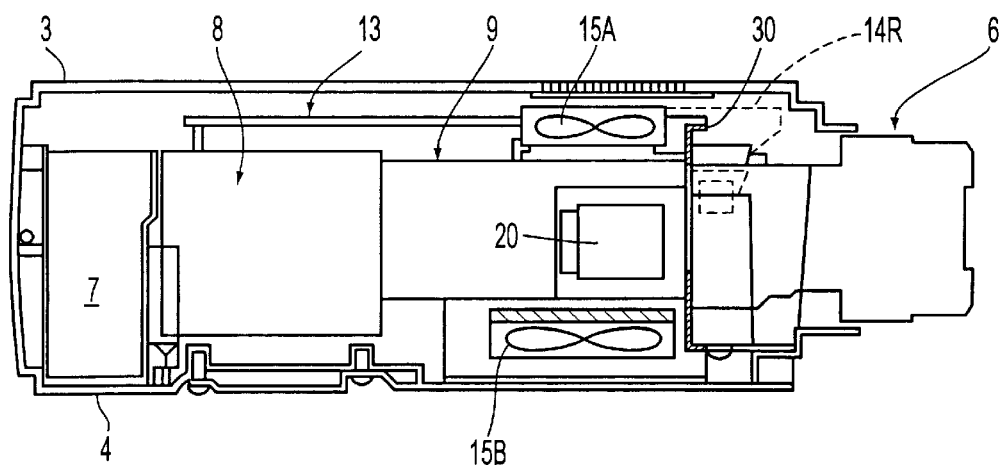
FIG. 2(B) is a diagram showing a three-dimensional layout of the components.

FIG. 2 shows the layout of components inside the outer case 2 of the projector 1. As shown in this drawing, a power unit 7 is disposed at a back end side in the outer case 2. A light source lamp unit 8 and an optical unit 9 are disposed at positions closer to a front side of the device. A proximal rear side of the projection lens unit 6 is positioned at a center of a front side of the optical unit 9.

Furthermore, an interface board 11 on which an I/O interface circuit is mounted is disposed at one side of the optical unit 9 so that it is oriented in the longitudinal direction of the device. A video board 12 on which a video signal processing circuit is mounted is disposed in parallel to the interface board 11. A control board 13 for controlling the device is disposed above the light source lamp unit 8 and the optical unit 9. Speakers 14R and 14L are disposed at the right corner and the left corner, respectively, at the front end of the device.

Intake fans 15A and 15B for cooling the interior of the device are disposed at above and below the optical unit 9. An exhaust fan 16 is disposed on a side surface of the device that corresponds to a back surface side of the light source lamp unit 8. Furthermore, an auxiliary cooling fan 17 for drawing a cooling air flow from the intake fan 15A into the power unit 7 is disposed at a position facing ends of the boards 11 and 12 in the power unit 7.

Of these fans, the fan 15B functions primarily as a fan for cooling liquid crystal panels 40R, 40G, and 40B which will be discussed hereinafter. Alternatively, the fan 15A may be used for cooling the liquid crystal panels 40R, 40G, and 40B.

The configurations of the optical unit and the optical system will now be described in conjunction with FIG. 3.

Figure 3A:
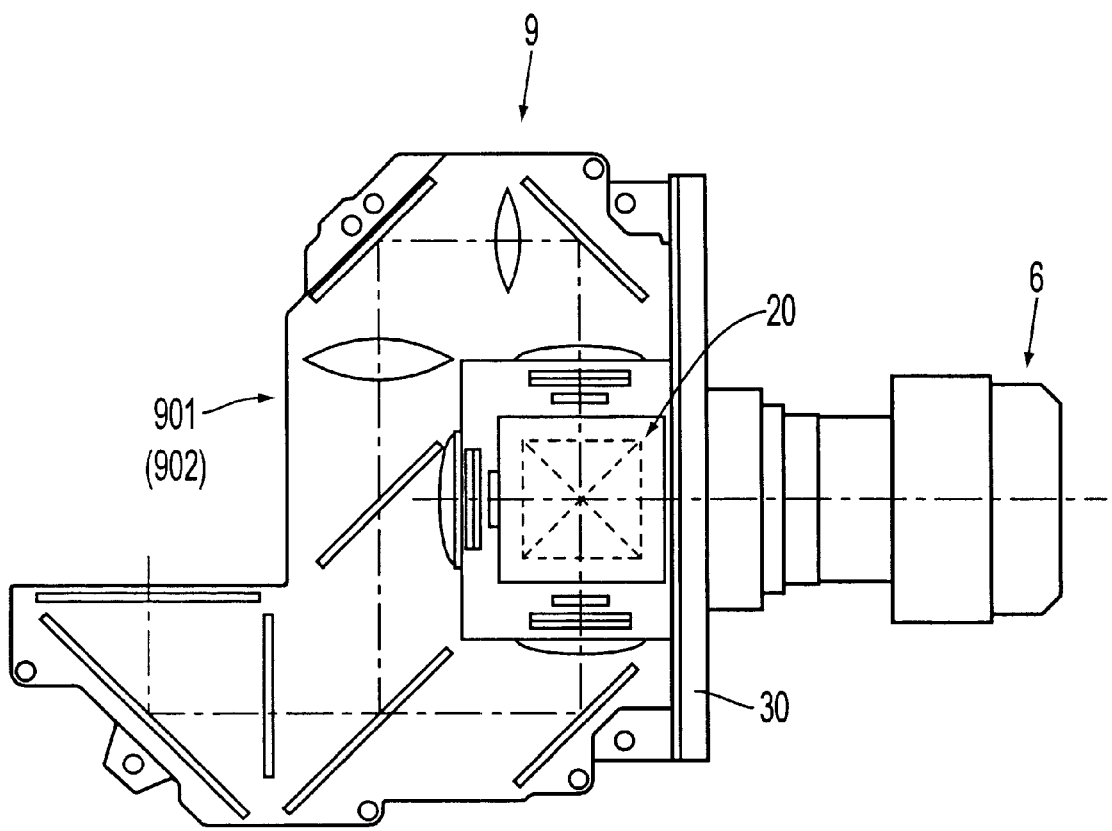
FIG. 3(A) is a diagram showing an optical lens unit and a projection lens unit that have been taken out.

FIG. 3(A) shows a part of the optical unit 9. As shown in the drawing, the optical unit 9 is retained in such a manner that optical elements other than a prism unit 20 are vertically held between upper and lower light guides 901 and 902. The upper light guide 901 and the lower light guide 902 are secured with fixing screws to the upper case 3 and the lower case 4, respectively. These upper and lower light guides 901 and 902 are also secured with fixing screws to the prism unit 20.

The prism unit 20 is secured with a fixing screw to a rear surface of a thick head plate 30, which is a die-cast plate. A proximal rear side of the projection lens unit 6 is also secured with a fixing screw to the front surface of the head plate 30. Hence, in this embodiment, the prism unit 20 and the projection lens unit 6 are fixed into one piece with the head plate 30 held therebetween. Thus, the two components are combined into one piece with the highly rigid head plate 30 held therebetween. Consequently, it is unlikely that the two components are displaced even if a shock or the like is applied to the projection lens unit 6.

Figure 3B:
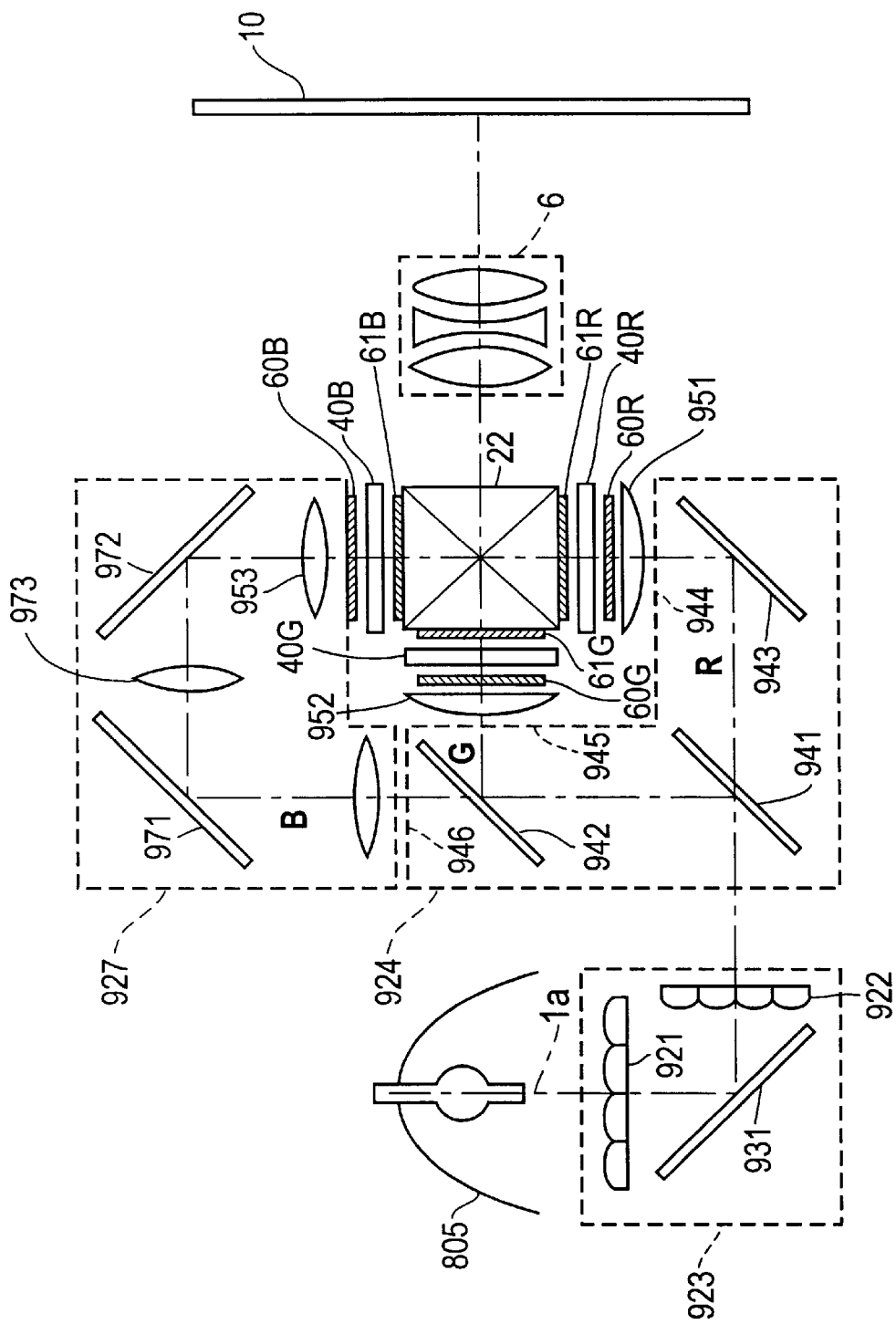
FIG. 3(B) is a schematic block diagram of an optical system.

FIG. 3(B) shows a schematic configuration of an optical system incorporated in the projector 1. The optical system of this embodiment is constituted by a light source lamp 805, a illumination optical system 923 composed of integrator lenses 921 and 922, which are uniform illumination optical elements, a color separation optical system 924 that separates a luminous flux W emitted from the illumination optical system 923 into red, green, and blue color luminous fluxes, R, G, and B, the three liquid crystal panels 40R, 40G, and 40B serving as modulating elements for modulating the respective luminous fluxes, a prism composite 20 serving as a color synthesizing optical system for synthesizing modulated color luminous fluxes, and the projection lens unit 6 for enlarging and projecting synthesized luminous fluxes onto a projection surface 10. The optical system further has a relay optical system 927 that leads a blue luminous flux B among the color luminous fluxes, which have been separated by the color separation optical system 924, to its associated liquid crystal panel 40B.

As the light source lamp 805, a halogen lamp, metal halide lamp, a xenon lamp, or the like may be used. The uniform illumination optical system 923 equipped with a reflection mirror 931 bends an optical axis 1a of an outgoing light from the illumination optical system at right angles toward the front of the device. The integrator lenses 921 and 922 are disposed so that they intersect at right angles with the mirror 931 located therebetween.

The color separation optical system 924 is formed of a blue green reflection dichroic mirror 941, a green reflection dichroic mirror 942, and a reflection mirror 943. The luminous flux W first reaches the blue green reflection dichroic mirror 941 where the blue luminous flux B and the green luminous flux G contained in the luminous flux W are reflected at right angles toward the green reflection dichroic mirror 942. The red luminous flux R is transmitted through the mirror 941 and reflected on the reflection mirror 943 at right angles before it is emitted toward the prism composite 20 from an emitting section 944 of the red luminous flux. The blue and green luminous fluxes B and G that have been reflected by the mirror 941 reach the green reflection dichroic mirror 942 where only the green luminous flux G is reflected and emitted toward the color synthesizing optical system from an emitting section 945 of the green luminous flux. The blue luminous flux B which has passed through the mirror 942 is emitted toward the relay optical system from an emitting section 946 of the blue luminous flux. In this embodiment, setting has been made so that all the distances from the emitting sections of the luminous fluxes of the uniform illumination optical elements to the emitting sections 944, 945, and 946 of the respective color luminous fluxes in the color separation optical system 924 are equal.

Condenser lenses 951 and 952 are disposed at the emitting sides of the emitting sections 944 and 945, respectively, of the red luminous flux and the green luminous flux of the color separation optical system 924. Hence, the red luminous flux and the green luminous flux emitted from the respective emitting sections enter these condenser lenses 951 and 952 to be collimated.

The red and green luminous fluxes R and G that have been collimated as mentioned above go through polarizers 60R and 60G so that their polarized directions are the same, then are incident upon the liquid crystal panels 40R and 40G and modulated so that image information associated with each color light ray is added. More specifically, these liquid crystal panels 40R and 40G are switch-controlled by image signals associated with image information by a driving unit, which is not shown, thereby modulating the color light rays passing therethrough. For such a driving, any known driving unit can be used.

The blue luminous flux B is transmitted through the relay optical system 927, and polarized by a polarizer 60B, then guided to the associated liquid crystal panel 40B where modulation is performed in the same manner on the basis of image information. The liquid crystal panels 40R, 40G, and 40B of the present embodiment may use, for example, poly-silicon TFTs as switching elements.

The relay optical system 927 is comprised of a condenser lens 974, an incident reflection mirror 971, an emitting reflection mirror 972, an intermediate lens 973 disposed between these mirrors, and a condenser lens 953 disposed before the liquid crystal panel 40B. Of the lengths of the optical paths of the color luminous fluxes, i.e. the distances from the light source lamp 805 to the liquid crystal panels, the length or the distance of the blue luminous flux B is the longest, so that the loss of the light quantity thereof is the largest. The loss of the light quantity, however, can be suppressed through the intermediary of the relay optical system 927.

Subsequently, the color luminous fluxes that have been modulated through the liquid crystal panels 40R, 40G, and 40B enter polarizers 61R, 61G, and 61B, and the light rays that have been transmitted through the polarizers are incident upon the prism composite 22 to be synthesized. In the present embodiment, the prism composite 22 may be formed of a dichroic prism used to constitute the color synthesizing optical system. A color image synthesized by the color synthesizing optical system is enlarged and projected onto a projection surface 10 installed at a predetermined position.

The structures of the prism unit and the head plate will now be described in conjunction with FIG. 4.

Figure 4:
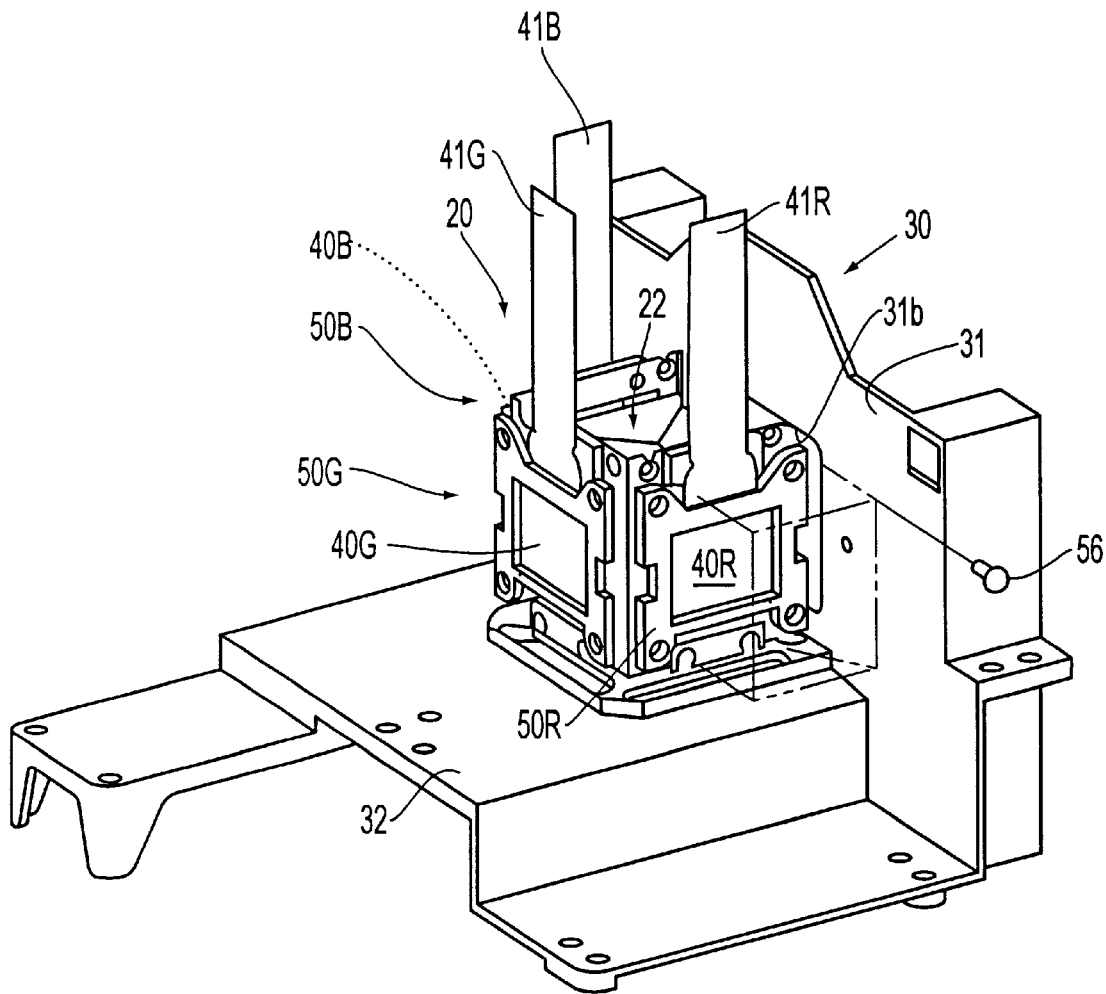
FIG. 4 is a segmentary perspective view showing a head plate and a prism unit and a liquid crystal panel unit supported thereby.

FIG. 4 specifically shows the head plate 30 and the prism unit 20 attached to the head plate 30. As shown in the drawing, the head plate 30 is basically constructed by a vertical wall 31 vertically extended over the width of the device and a bottom wall 32 that horizontally extends from the bottom end of the vertical wall 31. The vertical wall 31 is provided with a rectangular opening 31b through which light emitting from the prism unit 20 is transmitted. The vertical wall 31 is further provided many reinforcing ribs to enhance its rigidity. The prism unit 20 and the projection lens unit 6 are fixed in such a manner that they are positioned with the vertical wall 31 held therebetween (refer to FIG. 3(A)). This enhances the integrity of these two component units, so that it is very unlikely that mutual displacement will occur even if an impact force or the like is applied.

The prism unit 20 is installed on the bottom wall 32 of the head plate 30. The prism unit 20 is equipped with four prisms 21 having sections shaped in rectangular equilateral triangles, a prism composite 22 shaped in a rectangular parallelpiped composed by inter-joining the slopes of the aforesaid prisms, and a prism support plate 33 (refer to FIG. 5). The bottom portion of the prism composite 22 is fixed by means of bonding or the like to a surface of the prism support plate 33, and the prism support plate 33 is mounted on and fixed to the bottom wall 32 of the head plate. Of the side surfaces of the prism composite 22, three side surfaces functioning as light incident surfaces are provided with liquid crystal panel units 50R, 50G, and 50B sharing the same structure. The liquid crystal panels 40R, 40G, and 40B are retained on the liquid crystal panel units 50R, 50G, and 50B, respectively.

Referring now to FIG. 5 through FIG. 9, the configurations of the liquid crystal panel units 50R, 50G, and 50B mounted on the prism composite 22 of the prism unit 20 will now be described.

Figure 5:
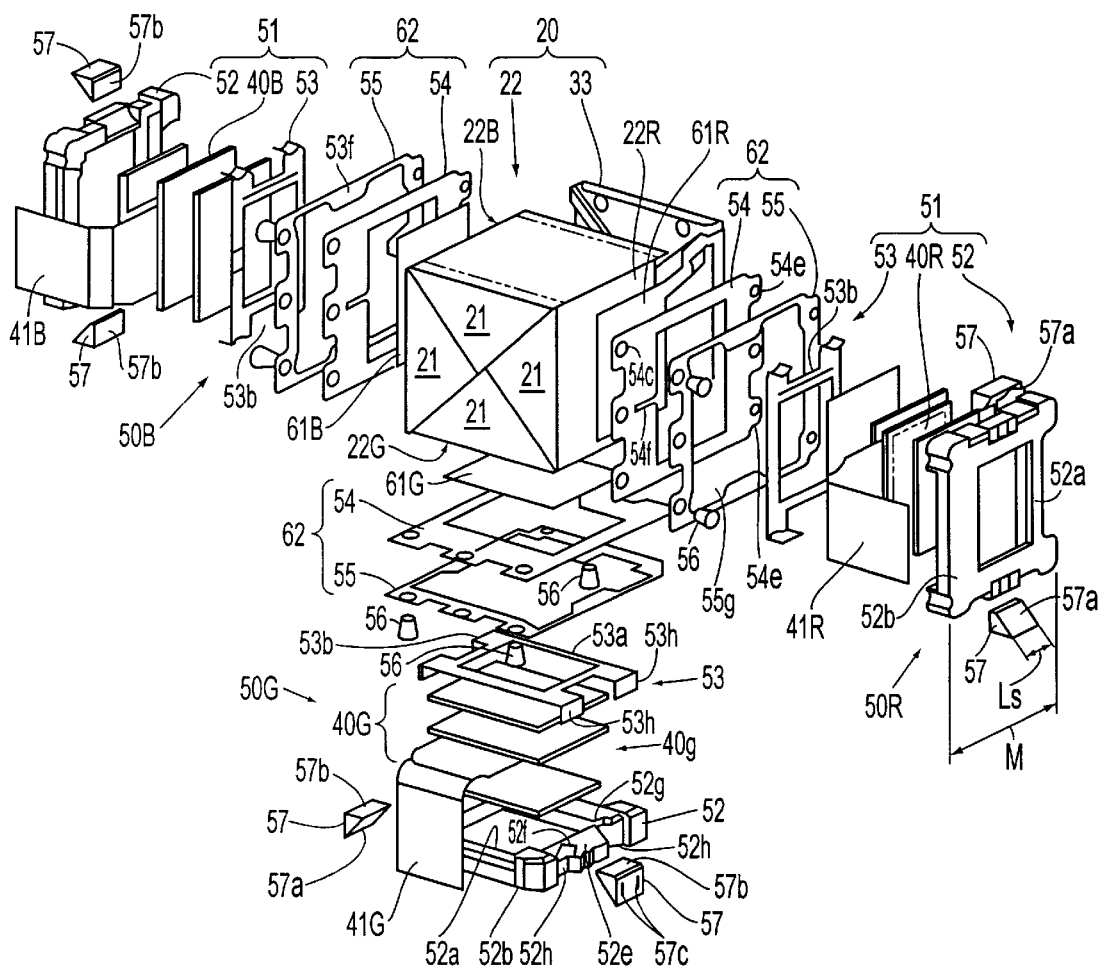
FIG. 5 is a perspective exploded view of liquid crystal panel units 50R, 50G, and 50B of FIG. 4.
Figure 6:
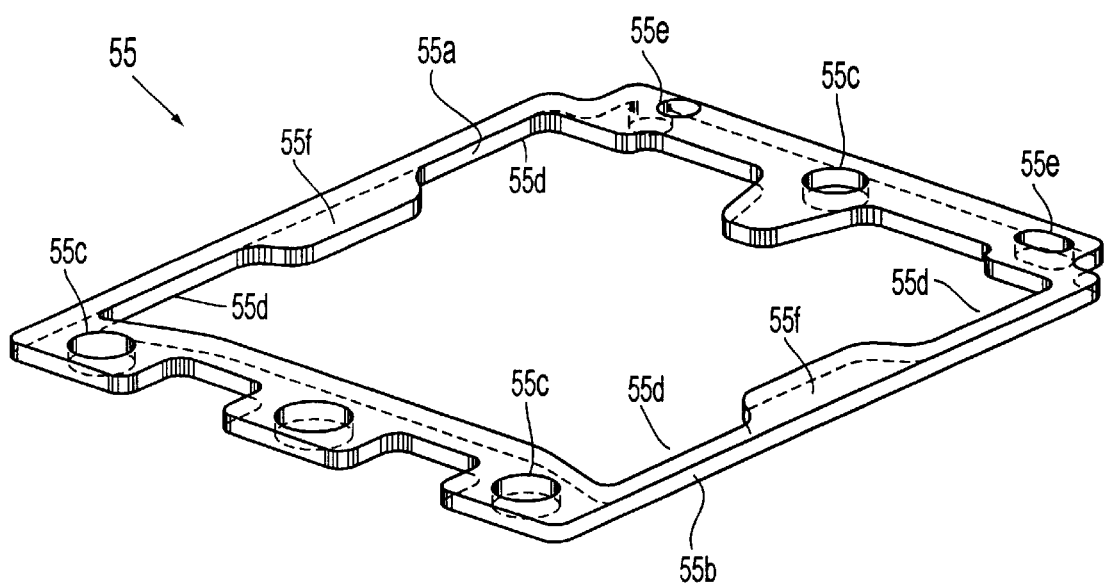
FIG. 6 is a perspective view showing an intermediate frame member used with an embodiment in accordance with the present invention.
Figure 7:
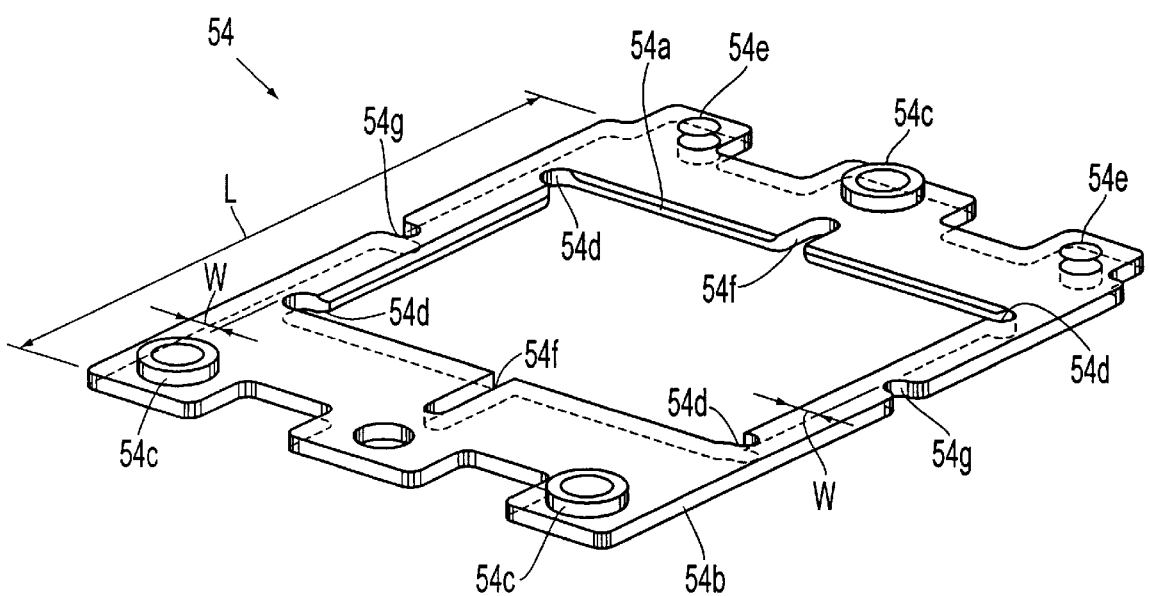
FIG. 7 is a perspective view showing a fixing frame member used with the embodiment.
Figure 8:
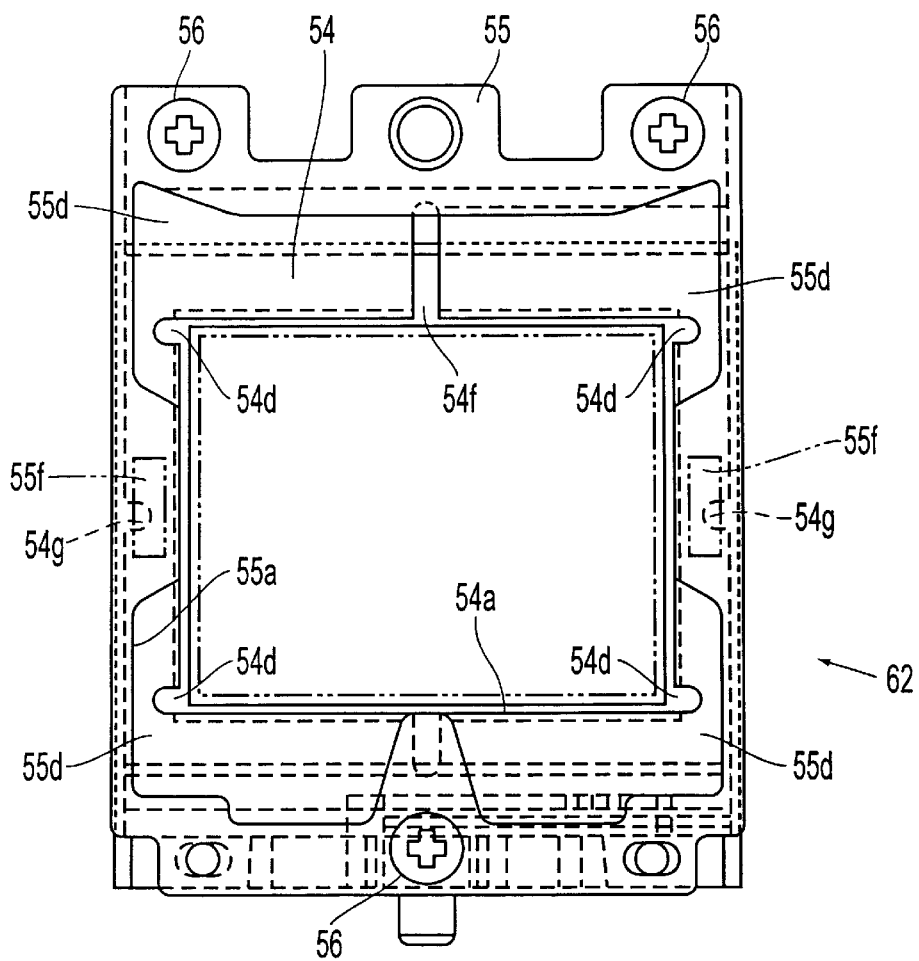
FIG. 8 is a front view showing a state of an interposed frame assembly compose by stacking the intermediate frame member and the fixing frame member.
Figure 9:
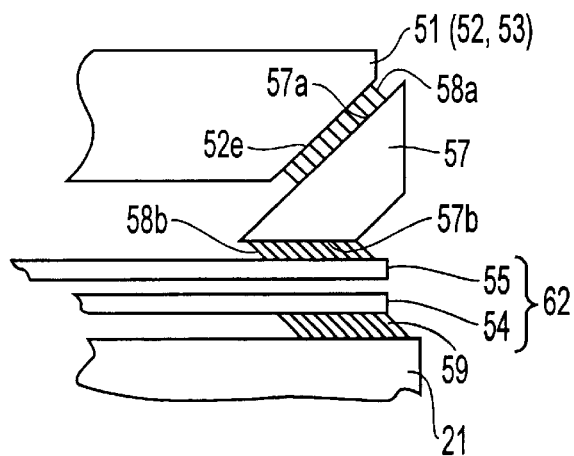
FIG. 9 is a segmentary sectional view showing a configuration of a neighborhood of a spacer of an assembled liquid crystal panel unit.

FIG. 5 is an exploded view of components of the liquid crystal panel units 50R, 50G, and 50B; FIG. 6 is a perspective view showing an intermediate frame member 55 used in an embodiment according to the present invention; FIG. 7 is a perspective view showing a fixing frame member 54 used in the embodiment; FIG. 8 is a front view showing an interposed frame assembly 62 constituted by stacking the intermediate frame member 55 and the fixing frame member 54; and FIG. 9 is a fragmentary sectional view showing a configuration around a spacer 57 of an assembled liquid crystal panel unit.

Since the liquid crystal panel units 50R, 50G, and 50B share the same configuration, the description will be given mainly of the liquid crystal panel unit 50G (the unit 50R or 50B will be referred to in some cases where the angles in the drawing permit easier viewing).

First, the liquid crystal panel unit 50G is provided with a panel frame assembly 51 (electro-optical device frame assembly) that holds and retains therein a liquid crystal panel 40G, which is an electro-optical device. The panel frame assembly 51 is equipped with a first frame member 52 disposed on the side of the light source 805 (outside) and a second frame member 53 disposed on the side of the prism composite 22 (inside), the liquid crystal panel 40G being held between these frame members.

The liquid crystal panel unit 50G is further provided with the fixing frame member 54 adhesively secured to a light incident surface 22G of the prism composite 22, and the intermediate frame member 55 screwed to the fixing frame 54. The fixing frame member 54 and the intermediate frame member 55 serve as the members constituting the interposed frame assembly 62 which is installed between the panel frame assembly 51 and the prism composite 22 to mainly facilitate attaching or detaching of the panel frame assembly 51 to or from the prism composite 22.

The liquid crystal panel unit 50G is further provided with two spacers 57 shaped substantially in a triangular prism for fixing the panel frame assembly 51, i.e. the liquid crystal panel 40G held and retained in the panel frame assembly 51, to the intermediate frame member 55, which has been fixed to the fixing frame member 54, via adhesive agents 58a and 58b (FIG. 9).

The configurations of individual components of the panel frame assembly 51 will be described in detail with reference to FIG. 5.

The first frame member 52 is equipped with a rectangular opening 52a for transmitting light therethrough, and a peripheral wall 52b of a given thickness formed to surround the four peripheral sides of the rectangular opening 52a. The second frame member 53 is also equipped with a rectangular opening 53a for transmitting light therethrough. The second frame member 53 is formed so that it exactly fits into the peripheral wall 52b of the first frame member 52.

Accordingly, fitting the second frame member 53 to the first frame member 52 with the liquid crystal panel 40G held between the first and second frame members 52 and 53 will automatically form the panel frame assembly 51 having the liquid crystal panel 40G sandwiched between these frame members 52 and 53.

The first frame member 52 and the second frame member 53 are fitted together by meshing engaging grooves 52h formed at top and bottom of the first frame member 52, guide grooves 52e through 52g being located therebetween, with hooks 53h formed in the second frame member 53. In FIG. 5, a member extending upward from the panel frame assembly 51 is a wiring flexible cable 41G. The same applies to reference numerals 41R and 41B in the remaining liquid crystal panel units 50R and 50B.

The first frame member 52 may be a molded member of a thermosetting resin in which carbon fiber or calcium carbonate has been added. Using such a resin material brings thermal expansion coefficient closer to that of glass constituting a prism than when a general resin material is used. Therefore, displacement of pixels or the like caused by thermal deformation can be reduced after the first frame member 52 has been fixed to the prism composite 22.

The configuration of the intermediate frame member 55 will now be described. As shown in FIG. 6 in an enlarged view, the intermediate frame member 55 is a flat rectangular frame member equipped with a rectangular opening 55a for transmitting light therethrough in its inner area, and a peripheral wall 55b of a given thickness surrounding the four sides of the opening 55a.

In this embodiment, the intermediate frame member 55 further has fixing sections 55f (portions indicated by a two-dot chain line in FIG. 8), to which the spacers 57 are to be secured, at around centers of right and left opposing sides of the peripheral wall 55b. Elastic portions 55d are formed on the inner periphery of the peripheral wall 55b and at upper and lower sides of the fixing sections 55f. The elastic portions 55d elastically deform if the frame member 55 expands or contracts due to heat so as to alleviate stress applied to the adhesive agent 58b (refer to FIG. 9) placed between the frame member 55 and the spacer 57.

Two holes 55c formed in the projecting portions at right and left ends of the upper side of the peripheral wall 55b and one hole 55c formed at the center of the bottom side are tapped holes for securing the intermediate frame member 55 to the fixing frame member 54 which will be described hereinafter.

The fixing frame member 54 which is shown in FIG. 7 in an enlarged view is a rectangular frame member that has a peripheral wall 54b of a given thickness on the four sides thereof, a rectangular opening 54a for transmitting light therethrough being formed in its inner area.

The rear surface of the fixing frame member 54 is secured to a light incident surface 22G of the prism composite 22 by an adhesive agent 59 (refer to FIG. 9). A total of three tapped holes 54c are formed at both corners of the upper side portion of the fixing frame member 54 and at the lateral center of the lower frame portion of the fixing frame member 54. These three tapped holes 54c correspond to the tapped holes 55c of the intermediate frame member 55.

The intermediate frame member 55 is fixed to the fixing frame member 54 by inserting fastening flat-headed screws 56 into the tapped holes 54c and 55c (refer to FIG. 8). In this embodiment, the intermediate frame member 55 is secured to the fixing frame member 54 by three screws 56; however, the number of the screws may be four or more. In general, fewer screws require fewer steps for fastening the screws. If five screws are used, the holes denoted by reference numerals 55e and 54e shown in FIG. 6 and FIG. 7 may be used.

In this embodiment, the fixing frame member 54 and the intermediate frame member 55 are fixed using screws. However, they may be detachably fixed using solder, an adhesive agent, clips, etc. in place of the screws.

Long thin slits 54f are formed in the vicinity of inner centers of the upper and lower sides of the outer peripheral wall 54b of the fixing frame member 54. In addition to the slits 54f at the inner ends of the upper and lower sides, there are slits 54d formed at the inner sides of the corners on the ends of the right and left sides, and slits 54g formed in the vicinity of the centers on the outer ends of the right and left sides. These slits 54f, 54d, and 54g have the same function as that of the elastic portions 55d of the intermediate frame member 55. Namely, the slits 54f, 54d, and 54g elastically deform when the frame member 54 thermally expands or contracts, thereby alleviating stress applied to the adhesive agent 59 placed between the frame member 54 and the prism 21.

Referring now to FIG. 5, FIG. 8, and FIG. 9, the disposition of the spacers 57 for positioning and fixing the panel frame assembly 51 to the prism composite 22 will be described.

Each of the spacers 57 has a slope surface 57a opposing a spacer guide surface 52e of the frame member 52 and a frame member opposing surface 57b facing the frame member 55. The slope surface 57a is fixed with an adhesive agent to spacer guide surfaces 52e through 52g (refer to FIG. 5) forming a recess at vertical center of each of the right and left side surfaces of the peripheral wall 52a of the first frame member 52 of the panel frame assembly 51.

Furthermore, the surface 57b, which faces the frame member, of the spacer 57 is formed at the vertical center of the right and left side surfaces of the second frame member 53 such that it faces the prism 21 through a spacer exposure opening 53b (refer to FIG. 5) formed by a U-shaped cut on the side of the rectangular opening 53a. The surface 57b facing the frame member is adhesively fixed to the substantially trapezoidal spacer fixing section 55f provided so that it protrudes inward from the peripheral wall of the rectangular opening 55a of the intermediate frame member 55.

Each of the spacers 57 of the present embodiment has two blind holes 57c in the rear surface thereof as illustrated in FIG. 5. These blind holes 57c function as engaging portions for chucking when the spacer 57 is chucked using a jig. Forming the blind holes 57c facilitates such chucking, thus permitting easier handling of the spacers.

Generally, glass spacers 57 may be used. However, if the first frame members 52 are made of resin molding, then the coefficient of thermal expansion will be greater than that of glass. Hence, the spacers 57 may peel off from the first frame members due to a difference in thermal expansion or the spacers 57 may be damaged due to temperature changes. In order to avoid such problems, it is desirable to use resin-moldings of an acrylic constituent or the like for the spacers 57.

Since using an acrylic constituent for the spacers 57 permits molding forming, a significant reduction in cost can be achieved in comparison with glass. Using a material that transmits ultraviolet rays for the spacers 57 makes it possible to employ, as the adhesive agent for adhesively fix the spacers 57, an ultraviolet-curing type adhesive agent that features less temperature rises and requires a shorter time for hardening.

A method for installing the liquid crystal panel units 50R, 50G, and 50B to the prism unit 20 will be explained in detail mainly with reference to the compositions of the members of the liquid crystal panel units shown in FIG. 5 and also to FIG. 10 through FIG. 12.

Figure 10:
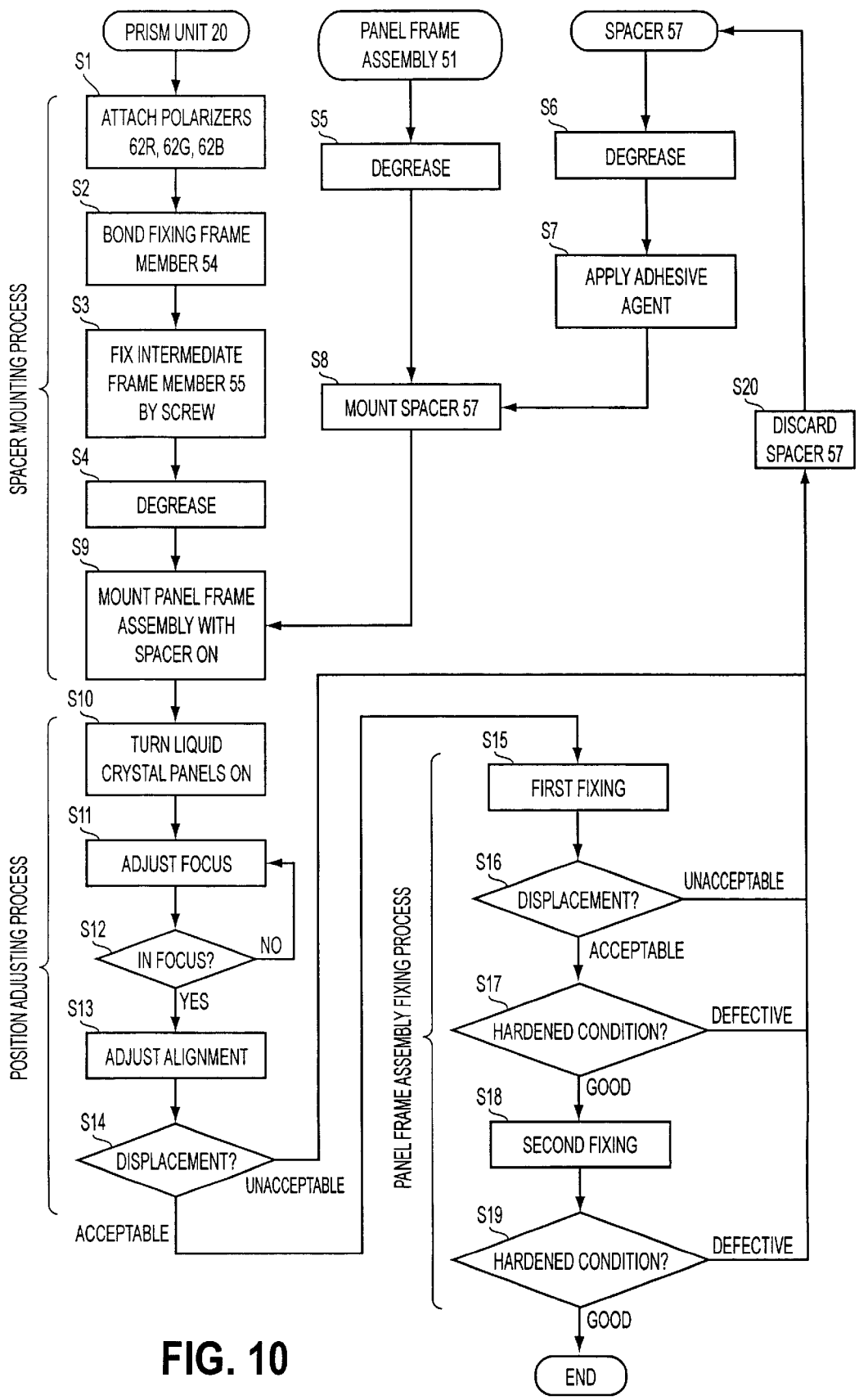
FIG. 10 is a flowchart illustrating an operation process of a method for installing a liquid crystal panel in accordance with the present invention.
Figure 11:
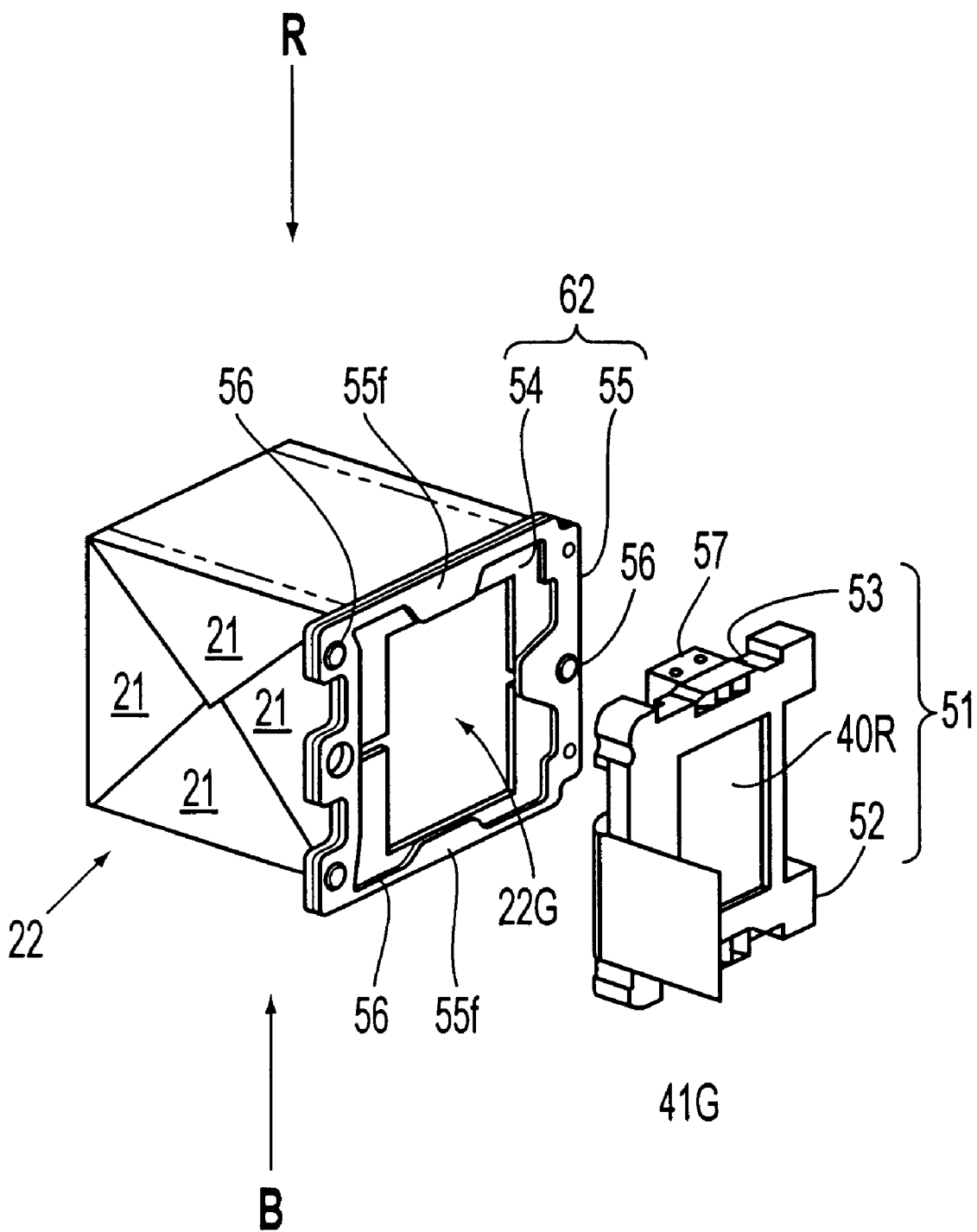
FIG. 11 is a diagram showing a state of step S8 in FIG. 10.
Figure 12A:
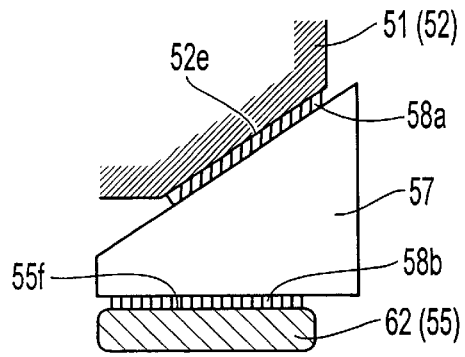
Figure 12B:
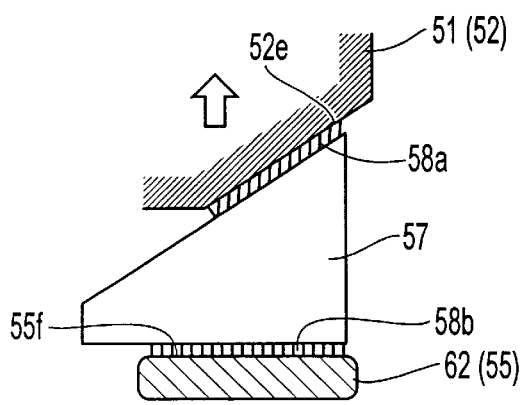
Figure 12C:
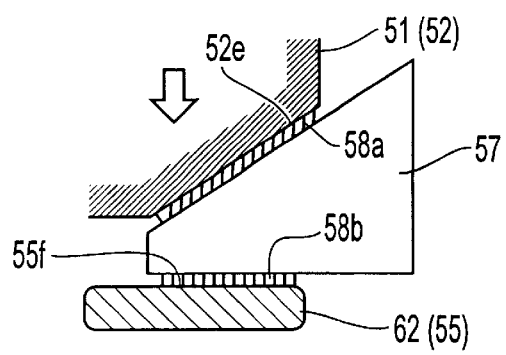
Figure 13:
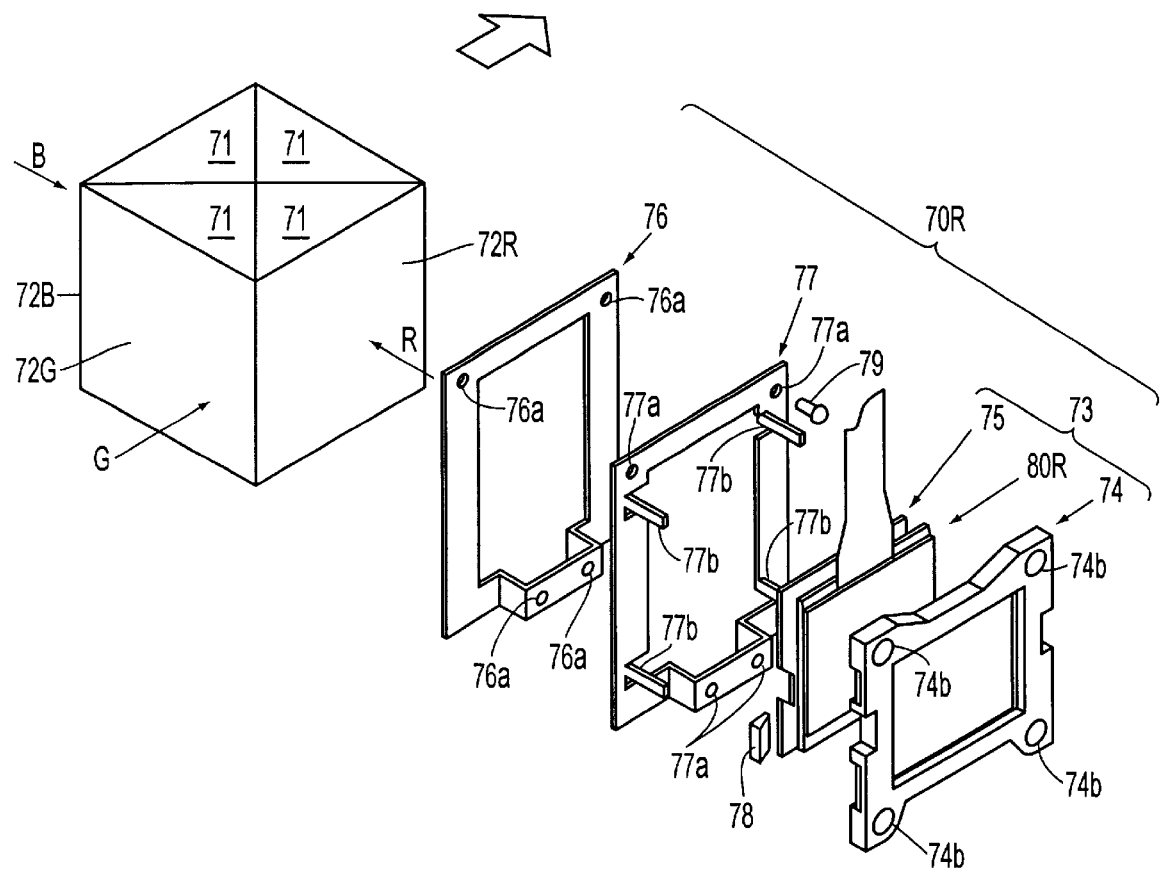
FIG. 13 is a diagram showing a configuration of a liquid crystal panel unit of a projector representing a conventional technology.

FIG. 10 shows a flowchart of the installation of the liquid crystal panel units 50R, 50G, and 50B to the prism unit 20; FIG. 11 shows a state of step S8 in FIG. 10; and FIGS. 12(A) through (C) illustrate the states of the spacer 57 in steps S11 and S13 in FIG. 10. Descriptions will be given according to the steps shown in FIG. 10.

First, the polarizers 60R, 60G, and 60B are attached to light incident surfaces 22R, 22G, and 22B of the prism composite 22 of the prism unit 20 (step S1 of FIG. 10). Then, the fixing frame members 54 are bonded to the light incident surfaces 22R, 22G, and 22B of the prism composite 22 (step S2 of FIG. 10) and the intermediate frame members 55 are screwed to the fixing frame members 54 (step S3 of FIG. 10). Implementing these steps will complete the installation of the interposed frame assemblies 62 to the prism unit 20.

The surfaces of the fixing frame members 54 to which the spacers 57 are to be bonded are degreased using alcohol or the like (step S4 of FIG. 10). The panel frame assemblies 51 individually sandwiching the liquid crystal panels 40R, 40G, and 40B, respectively, between the two frame members, namely, the first frame members 52 and the second frame members 53, and the spacers 57 are also degreased using alcohol or the like (steps S5 and S6 of FIG. 10).

Next, an adhesive agent is applied to the spacers 57 (step S7 of FIG. 10). Then, the spacers 57 are installed to the spacer guide surfaces 52e through 52g of the first frame members 52 as shown in FIG. 11 (step S8 of FIG. 10). In this state, the spacers 57 are installed merely by the surface tension of the adhesive agent.

Steps S7 and S8 for installing the spacers 57 may be replaced by a step wherein the adhesive agent 58a is applied to the spacer guide surfaces 52e through 52g, then the spacers 57, to which no adhesive agent has been applied, are attached thereto. In this case, the adhesive agent 58b must be applied also to the spacer fixing sections 55f of the intermediate frame member 55 in advance.

Furthermore, the panel frame assemblies 51, on which the spacers 57 have been mounted, are mounted on the prism unit 20 to which the interposed frame assemblies 62 have been installed (step S9 of FIG. 10) so that the adhesive agent applied to the spacers 57 comes in contact also with the interposed frame assemblies 62.

Steps S1 through S9 set forth above constitute the spacer mounting process for mounting the spacers 57 via an adhesive agent between the panel frame assemblies 51 and the prism unit 20.

Subsequently, the liquid crystal panels 40R, 40G, and 40B are turned ON (step S10 of FIG. 10). Focus adjustment is performed to align the focusing surfaces of the liquid crystal panels 40R, 40G, and 40B held in a sandwiched state by the panel frame assemblies 51 to the focusing surface of the projection lens unit 6 (step S11 of FIG. 10). If an optical axis of the projection lens unit 6 is denoted as a z-axis, and two axes orthogonal thereto are denoted as an x-axis and a y-axis, then a total of three axis directions, namely, a position (x) in the x-axis direction, a tilt ($x_\theta$) in a rotational direction based on the x-axis, and a tilt ($y_\theta$) in a rotational direction based on the y-axis, are adjusted in this step S11. This adjustment is made by using a neighborhood of the liquid crystal panels 40R, 40G, and 40B as a reference. After the focus adjustment, the focus condition is checked (step S12 of FIG. 10); if the result of the focus adjustment is no good, then the program returns to step S11 again to carry out the focus adjustment.

In step S12, if the result of the focus adjustment is good, then the adjustment of alignment is performed to align the positions of the pixels of the liquid crystal panels 40R, 40G, and 40B (step S13 of FIG. 10). If an optical axis of the projection lens unit 6 is denoted as a z-axis, and two axes orthogonal thereto are denoted as an x-axis and a y-axis, then adjustment in a total of three axis directions is performed, namely, positions (x) in an x-axis direction, positions (y) in a y-axis direction, and tilts ($z_\theta$) in a rotational direction based on the z-axis of the liquid crystal panels 40R, 40G, and 40B. Preferably, the adjustment of alignment is carried out by using a pixel of one of the three liquid crystal panels 40R, 40G, and 40B as a reference. Alternatively, however, the adjustment may be performed individually.

For making the focus adjustment and the alignment adjustment, the spacer 57 is retained between the spacer guide surfaces 52e through 52g and the interposed frame assembly 62 by the surface tension of the adhesive agents 58a and 58b, and the position thereof is changed as the panel frame assembly 51 is moved during the adjustment, as illustrated in FIGS. 12(A) through (C). After the adjustment of alignment, the displacement amount of the pixels of the respective liquid crystal panels 40R, 40G, and 40B is checked (step S14 of FIG. 10), and if the displacement amount is out of a permissible range (if the displacement is unacceptable), the spacer 57 is discarded (step S20 of FIG. 10) and replaced by a new spacer 57, then the procedure from step S6 and after is repeated.

Steps S10 through S14 set forth above constitute a position adjustment process for adjusting the position where the panel frame assemblies 51 are installed to the prism unit 20.

If the displacement amount of pixels is found to be within the permissible range (good) in step S14, then first hardening of the adhesive agent 58a between the spacer 57 and the panel frame assembly 51 and the adhesive agent 58b between the spacer 57 and the interposed frame assembly 62 are carried out (step S15 of FIG. 10). When an ultraviolet-curing adhesive agent is used as the adhesive agents 58a and 58b, the curing can be accomplished by irradiating the adhesive agents 58a and 58b with ultraviolet rays for a predetermined time. The time for applying the ultraviolet rays normally ranges from a few tens of seconds to a few minutes although it depends on the type or quantity of the adhesive agent.

Then, the displacement amount of the pixels of the liquid crystal panels 40R, 40G, and 40B is checked again (step S16 of FIG. 10). If the displacement amount is out of a permissible range (if the displacement is unacceptable), the spacer 57 is discarded (step S20 of FIG. 10) as in the case of step S14 and replaced by a new spacer 57, then the procedure from step S6 and after is repeated.

If the displacement amount of the pixels is found to be within the permissible range (good), then the hardened conditions of the adhesive agent 58*a* between the spacer 57 and the panel frame assembly 51 and the adhesive agent 58*b* between the spacer 57 and the interposed frame assembly 62 are checked (step S17 of FIG. 10). If the hardened conditions are defective, then the spacer 57 is discarded (step S20 of FIG. 10) as in the case of step S14 and replaced by a new spacer 57, then the procedure from step S6 and after is repeated.

When the hardened conditions are good, second hardening of the adhesive agent 58*a* between the spacer 57 and the panel frame assembly 51 and the adhesive agent 58*b* between the spacer 57 and the interposed frame assembly 62 is carried out (step S18 of FIG. 10). The second hardening is carried out in the same manner as for the first hardening. However, the hardening time thereof may be different from that of the first hardening. It is also possible to complete the hardening in only one step by skipping the second hardening. It is preferable, however, to divide the hardening process into two steps as in the present embodiment to improve throughput.

Also from the viewpoint of improved reliability, it is preferable to divide the hardening process into two steps to check the displacement amount or the hardened conditions before performing the second hardening so as to allow reworking if a defect is found. In addition, since reworking is possible before implementing the second hardening, the spacer 57 can be easily removed if reworking is required.

Following the second hardening, the hardened conditions of the adhesive agent 58*a* between the spacer 57 and the panel frame assembly 51 and the adhesive agent 58*b* between the spacer 57 and the interposed frame assembly 62 are checked again (step S19 of FIG. 10). If the hardened conditions are defective, the spacer 57 is discarded (step S20 of FIG. 10) as in the case of step S14 and replaced by a new spacer 57, then the procedure from step S6 and after is repeated. If the hardened conditions are good, then the installation of the liquid crystal panel units 50R, 50G, and 50B to the prism unit 20 is completed.

Steps S15 through S19 set forth above make up the panel frame assembly fixing process for fixing the panel frame assemblies 51 (electro-optical device frame assembly fixing process) by hardening adhesive agents.

The installation of the aforesaid liquid crystal panel units 50R, 50G, and 50B to the prism unit 20 can be accomplished most efficiently with high reliability when carried out with the projection lens unit 6 and the prism unit 20 fixed to the head plate 30, considering that the focus adjustment and the alignment adjustment are performed during the installation. Alternatively, however, the installation may be carried out with only the prism unit 20 fixed to the head plate 30 without fixing the projection lens unit 6 thereto. Further alternatively, the liquid crystal panel units 50R, 50G, and 50B may be installed before fixing the prism unit 20 to the head plate 30.

In the method of the present embodiment, the temporary fixing step in the conventional technique has been excluded. This makes it possible to reduce the positional displacement of the liquid crystal panels 40R, 40G, and 40B caused by performing the temporary fixing and the final fixing at different positions in the conventional technique, improve the fixing operation efficiency, and simplify the fixing operation process.

Figure 14:
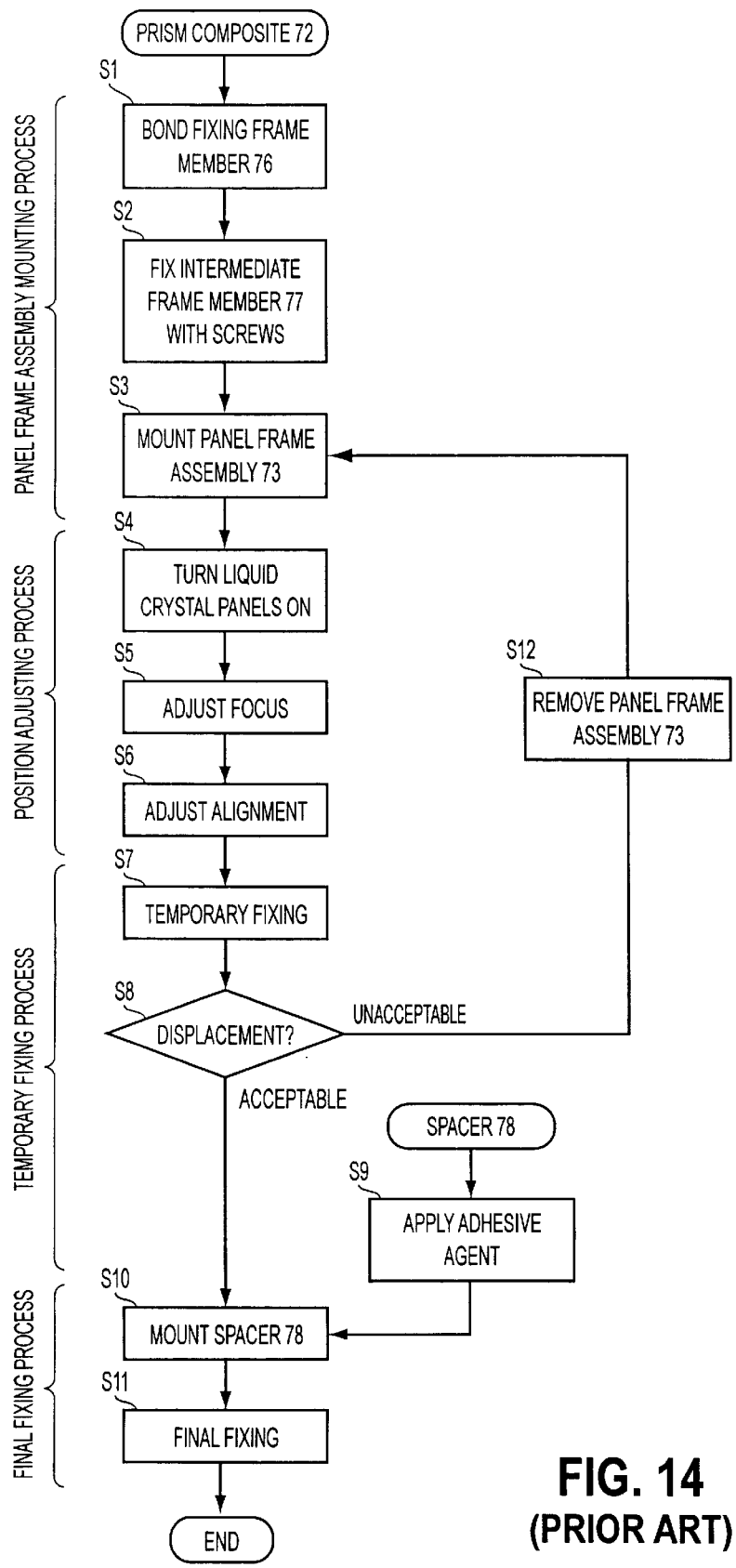
FIG. 14 is a flowchart illustrating a method for installing the liquid crystal panel unit of the projector representing the conventional technology.

The first fixing and the second fixing by the adhesive agent (steps S15 and S18 of FIG. 10) are performed to harden the adhesive agent in two steps, while the hardening could be completed in one step. In other words, steps S15 through S18 in FIG. 10 are equivalent to the portion of the final fixing in the conventional technique (step S11 of FIG. 14). Hence, the first fixing by the adhesive agent (step S15 of FIG. 10) is different from the temporary fixing step in the conventional technique.

The present invention is not limited to the embodiment described above. Numerous modifications and changes are possible and regarded as falling within the scope of the invention.

(1) The method for installing the liquid crystal panels to a prism set forth above is applicable not only to a projector but also to other devices employing electro-optical devices and prisms. Electro-optical devices include liquid crystal panels, CCD devices used with cameras, etc., micro mirror devices, and PLZT panels. Prisms include color separation prisms, prisms for performing polarization separation or polarization recombination, in addition to the color synthesizing prisms set forth above.

(2) The descriptions have been given of an example wherein the fixing frame member and the intermediate frame member are separate members. Alternatively, however, the panel frame assemblies may be directly installed via the spacers to the fixing frame member, omitting the intermediate frame member.

According to the present invention disclosed by the application, the adhesive agent hardening operation (the electro-optical device frame assembly fixing process) can be completed in one step by excluding the temporary fixing step from the process for installing an electro-optical device to a prism, and the fixing portions where the electro-optical device frame assemblies holding and retaining the electro-optical devices are fixed to the prism are limited to the spacers, thus making it possible to achieve improved positional accuracy of the electro-optical devices, improved operation efficiency, and simplified operation process. This in turn makes it possible to reduce the positional displacement of the electro-optical devices attributable to the temporary fixing and the final fixing conducted at different positions in the conventional method, thus permitting improved fixing operation efficiency and simplified fixing operation process.

What is claimed is:

1. A method for installing an electro-optical device to a prism, comprising:

mounting a spacer, with an adhesive agent, between an electro-optical device frame assembly, which retains an electro-optical device, and a prism;

adjusting a position where the electro-optical device is installed to the prism after the spacer mounting step; and fixing the electro-optical device frame assembly by hardening the adhesive agent after the position adjusting step.

2. The method for installing an electro-optical device to a prism according to claim 1, the spacer being mounted by applying the adhesive agent between the electro-optical device frame assembly and an interposed frame assembly, which has been fixed to a surface of the prism, in the spacer mounting step.

3. The method for installing an electro-optical device to a prism according to claim 2, the interposed frame assembly comprising a fixing frame member to be attached to the prism, and an intermediate frame member detachably fixed to the fixing frame member.

4. The method for installing an electro-optical device to a prism according to claim 3, the spacer being mounted by applying the adhesive agent between the intermediate frame member and the electro-optical device frame assembly.

5. The method for installing an electro-optical device to a prism according to claim 1, the electro-optical device frame assembly fixing step including a fixed state checking step for checking for displacement of an installation position and an adhesion state of the electro-optical device.

6. The method for installing an electro-optical device to a prism according to claim 5, the spacer being removed and returned to the spacer mounting step when a fixed condition of the electro-optical device frame assembly is found defective in the fixed state checking step.

7. A method for installing an electro-optical device to a prism, comprising:
mounting a spacer, with an adhesive agent, between an electro-optical device frame assembly, which retains an electro-optical device, and a prism;
adjusting a position where the electro-optical device is installed to the prism after the spacer mounting step; and
fixing the electro-optical device frame assembly by hardening the adhesive agent after the position adjusting step, the electro-optical device frame assembly fixing step comprising a plurality of fixing steps for gradually hardening the adhesive agent.

8. The method for installing an electro-optical device to a prism according to claim 7, the spacer being mounted by applying the adhesive agent between the electro-optical device frame assembly and an interposed frame assembly, which has been fixed to a surface of the prism, in the spacer mounting step.

9. The method for installing an electro-optical device to a prism according to claim 8, the interposed frame assembly comprising a fixing frame member to be attached to the prism, and an intermediate frame member detachably fixed to the fixing frame member.

10. The method for installing an electro-optical device to a prism according to claim 9, the spacer being mounted by applying the adhesive agent between the intermediate frame member and the electro-optical device frame assembly.

11. The method for installing an electro-optical device to a prism according to claim 7, the electro-optical device frame assembly fixing step including a fixed state checking step for checking for displacement of an installation position and an adhesion state of the electro-optical device.

12. The method for installing an electro-optical device to a prism according to claim 11, the spacer being removed and returned to the spacer mounting step when a fixed condition of the electro-optical device frame assembly is found defective in the fixed state checking step.

13. A manufacturing method for a projector equipped with a plurality of electro-optical devices for forming an image, a prism for synthesizing respective luminous fluxes modulated by the electro-optical devices, and a projection lens for projecting light synthesized by the prism, the manufacturing method comprising:
installing the electro-optical device to the prism by the method according to claim 1.

14. The manufacturing method for a projector according to claim 13, a fan for cooling the electro-optical devices is provided below or above the prism, and the spacers are mounted at right and left of the electro-optical device frame assembly.

15. The manufacturing method for a projector according to claim 13, the electro-optical device frame assembly fixing step comprising a plurality of fixing steps for gradually hardening the adhesive agent.

16. The manufacturing method for a projector according to claim 13, the spacer being mounted by applying the adhesive agent between the electro-optical device frame assembly and an interposed frame assembly, which has been fixed to a surface of the prism, in the spacer mounting step.

17. The manufacturing method for a projector according to claim 16, the interposed frame assembly comprising a fixing frame member to be attached to the prism, and an intermediate frame member detachably fixed to the fixing frame member.

18. The manufacturing method for a projector according to claim 17, the spacer being mounted by applying the adhesive agent between the intermediate frame member and the electro-optical device frame assembly.

19. The manufacturing method for a projector according to claim 13, the electro-optical device frame assembly fixing step including a fixed state checking step for checking for displacement of an installation position and an adhesion state of the electro-optical device.

20. The manufacturing method for a projector according to claim 19, the spacer being removed and returned to the spacer mounting step when a fixed condition of the electro-optical device frame assembly is found defective in the fixed state checking step.

21. The method for installing an electro-optical device to a prism according to claim 1, the step of mounting a spacer including applying the adhesive agent to two surfaces of the spacer that intersect to form an acute angle.

22. The method for installing an electro-optical device to a prism according to claim 21, the step of mounting a spacer including mounting a spacer that is a trapezoid.

23. The method for installing an electro-optical device to a prism according to claim 1, the step of adjusting a position including moving the spacer along a longitudinal direction of the electro-optical device frame assembly.

* * * * *